United States Patent [19]

Beery et al.

[11] Patent Number: 4,577,096

[45] Date of Patent: Mar. 18, 1986

[54] MULTIPLE COPY AND TRANSPARENCY DETECTOR WITH ILLUMINATION CONTROL

[75] Inventors: Jack Beery, Fremont, Calif.; Frederick A. Donahue, Walworth; Ronald E. Shaul, Canandaigua, both of N.Y.

[73] Assignee: Xerox Corporation, Stamford, Conn.

[21] Appl. No.: 523,516

[22] Filed: Aug. 15, 1983

[51] Int. Cl.⁴ .......... G01J 1/32

[52] U.S. Cl. .......... 250/205; 250/223 R

[58] Field of Search .......... 250/205, 214 AG, 214 B, 250/223 R, 221, 222.1; 377/53; 271/263

[56] References Cited

U.S. PATENT DOCUMENTS

| | | | |
|---|---|---|---|
| 3,396,965 | 8/1968 | Dennis et al. | 271/64 |
| 3,778,051 | 12/1973 | Allen et al. | 271/57 |
| 3,882,308 | 5/1975 | Daughton et al. | 250/222 |
| 3,932,755 | 1/1976 | Sagawa | 250/349 |
| 4,097,731 | 6/1978 | Krause et al. | 250/214 AG |
| 4,352,013 | 9/1982 | Fasig et al. | 250/223 R |
| 4,406,996 | 9/1983 | Oka | 250/205 |

*Primary Examiner*—David C. Nelms
*Attorney, Agent, or Firm*—Ronald F. Chapuran

[57] ABSTRACT

A sheet detector having an emitter (lamp), detector (phototransistor), operational amplifier and an RC network. As contamination is deposited on the emitter or detector, a feedback loop provides more drive to the lamp providing sufficient drive to hold the emitter of the phototransistor at its desired stage. As a first copy paper is passed between the emitter and detector, the RC network of a common mode operational amplifier detects a change and generates an output. As a subsequent sheet enters the system, the transmissibility abruptly changes again causing the common mode operational amplifier to provide a subsequent pulse indicating the presence of a multiple feed.

8 Claims, 3 Drawing Figures

MULTIPLE COPY AND TRANSPARENCY DETECTOR WITH ILLUMINATION CONTROL

This invention relates to a multiple sheet or transparency detection device to detect the presence of superposed sheets or transparencies advanced along a sheet path and to indicate to a machine control that a multiple sheet or transparency feed condition has occurred.

In feeding copy sheet material along a path, for example, through a copy processor, it is essential to be able to detect the presence or absence of a transparency or to detect the forwarding of multiple or superposed sheets. Without this detection capability, jams occur at the processing stations resulting in machine malfunctions. The problem becomes even more severe with the advent of high speed reproduction machines, feeding different sheet sizes, weights and materials and incorporating complex feeding systems.

Many examples of sheet detectors are found in the prior art, for example U.S. Pat. No. 3,278,254 disclosing a photosensitive double sheet detector. In particular, a lamp as a source of light and solar cell responsive to reflected light are used for generating a variable current proportional to the distance of the sheet from the detector and fiber optic bundles communicating with the light source and the detector are separated by a specific angle to determine the distance of an object from the detector at which the maximum current is obtained. This type of system is extremely sensitive to the distance of the sheet from the detector and, therefore, the system must be positioned with a high degree of accuracy.

Other systems use mechanical sensors for detection of multiple or superposed sheets as taught in U.S. Pat. No. 3,396,965. A difficulty with mechanical detectors is that they are often limited to specific sheet thicknesses. If a different thickness is to be accommodated, it is necessary to make mechanical adjustments to the detector.

Other detectors such as shown in U.S. Pat. No. 3,778,051 show a transducer means to produce signals proportional to the thickness of sheets of material. A binary signal representative of the thickness of an initially fed sheet of material is compared with the signals representative of the thickness of subsequently fed sheets. When the thickness of a subsequently fed sheet of material exceeds the thickness of an initially fed sheet of material, the comparator produces an error signal resulting in the deflection of the subsequently fed sheet of material from the sheet feeding mechanism.

U.S. Pat. No. 3,932,755 teaches another method for detecting superposed sheets along a path using a high reflectivity plate and a low reflectivity plate and determining the difference between the quantity of reflected rays from the first plate and the quantity of reflected rays from the second plate to recognize superposed sheets.

U.S. Pat. No. 3,882,308 teaches a multiple sheet detecting system including a source of illumination and a photosensitive element. A comparison is made between the detected light rays from a sample sheet and from a sheet in the sheet path. The system can be calibrated for varying circuit parameters to accommodate different sheet weights and types. Another method of detecting multiple feeds is the use of in-line vacuum ports on each side of a paper transport. The purpose of the vacuum port is to draw the sheet to the vacuum and then sense that it is against the port. If both ports are closed at the same time, it is assumed that a multiple copy has been detected.

A difficulty with many of the prior art multiple sheet detectors is that they are sensitive to the distance of the sheet from the detector. It is also often necessary to readjust the detector in order to be able to detect sheets of different thicknesses. Another difficulty with the prior art detectors is that they are often complex and costly and not easily adapted to material of varying composition. Another problem with prior art optical detectors is burn through. That is, it is often difficult to control the optical energy within given limits.

It is an object of the present invention, therefore, to provide an improved sheet detection system. It is another object of the present invention to detect superposed sheets or transparencies fed in a sheet path and to indicate this condition regardless of the weight or thickness of the sheet stock being conveyed. It is still another object of the present invention to enable detection of sheets being fed past a detection station at varying rates of speed and to provide a relatively simple and economical as well as adaptable means to detect various sheet configurations and compositions. It is still another object of the present invention to be able to detect multiple sheets without contacting or disturbing in any manner the sheets being detected and to be able to detect multiple sheets with very minimal lead edge differentials. It is still another object of the present invention to be able to provide a sheet detector that in turn can compensate for the degradation of the detector system due to dirt contamination and other foreign material and to maintain the same generally uniform detector signal when sheets to be detected are not present. Another object of the present invention is to provide an edge detector, in particular an edge detector whose optical energy can be controlled within given limits.

Briefly, the present invention is a sheet detector having an emitter (lamp), detector (phototransistor), operational amplifier and an RC network. As contamination is deposited on the emitter or detector, a feedback loop provides more drive to the lamp providing sufficient drive to hold the emitter of the phototransistor at its desired stage. As the edge of a first sheet is passed between the emitter and detector, the RC network of a common mode operational amplifier detects a change and generates an output. As the edge of a subsequent sheet enters the system, the transmissibility abruptly changes again causing the common mode operational amplifier to provide a subsequent pulse indicating the presence of a multiple feed. Similarly, the edge detection can be used to detect a single transparency.

Other objects and advantages of the present invention will become apparent upon reading the following detailed description and upon reference to the drawings wherein the same reference numerals have been applied to like parts and wherein.

Figure 1:
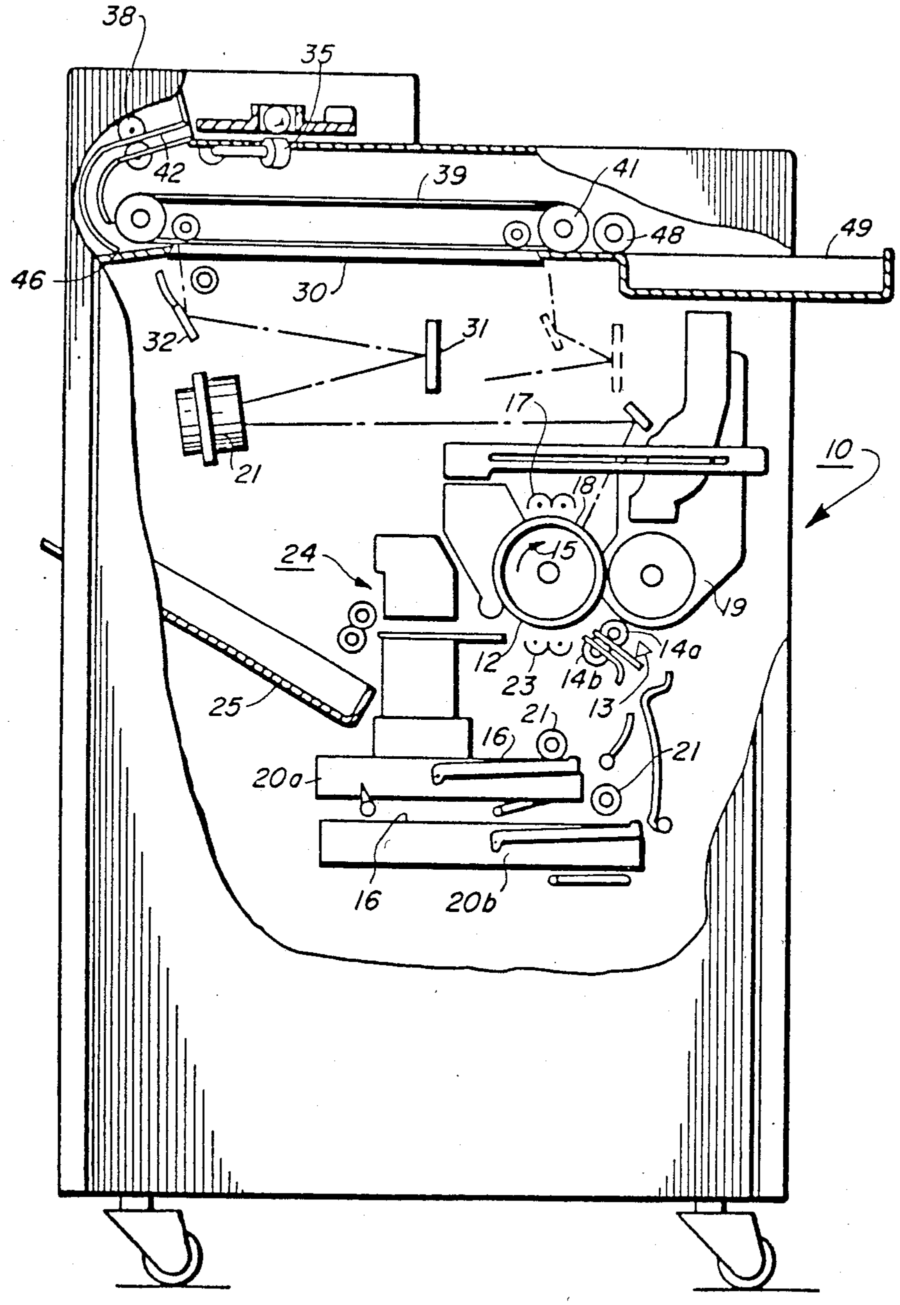
FIG. 1 is a representation of a reproducing apparatus incorporating the present invention.

Referring now to FIG. 1, there is shown by way of example an automatic xerographic reproducing machine 10 including an image recording drum-like member 12, its outer periphery coated with a suitable photoconductive surface.

The drum 12 moves the photoconductive surface in the direction of arrow 15 through a charging station 17 providing an electrostatic charge uniformly over the photoconductive surface. Thereafter, the drum 12 is rotated to exposure station 18 and the charged photoconductive surface is exposed to light image of the original document to be reproduced. The charge is selectively dissipated in the light exposed regions to record the original document in the form of an electrostatic latent image. After exposure drum 12 rotates the electrostatic latent image recorded on the photoconductive surface to development station 19 wherein a conventional developer mix is applied to the photoconductive surface of the drum 12 rendering the latent image visible.

Copy sheets 16 of the final support material are supported in a stack arrangement on either elevating stack main tray 20*a* or auxiliary tray 20*b*. With the stack at its elevated position, a sheet separator 21 feeds individual sheets therefrom to a registration system. The registration system includes registration switch 13 and registration rolls 14*a* and 14*b*. A copy sheet 16 is registered in the nip of register rolls 14*a* and 14*b*.

The sheet is then forwarded to the transfer station in proper registration with the image on the drum 12. The developed image on the photoconductive surface is brought into contact with a copy sheet 16 and the toner image is transferred from the photoconductive surface to the contacting side of the copy sheet 18. Following transfer of the image, the final support material is transported through a detack station where detack corotron 23 uniformly charges the support material to separate it from the drum 12.

The copy sheet 16 is then advanced to a suitable fusing station 24 for coalescing the transferred powder image to the support material. After the fusing process, the copy sheet 16 is advanced to a suitable output device such as tray 25.

The original document to be reproduced is placed image side down upon a horizontal transparent plate 30 and scanned by means of a moving optical system. The scanning system includes a stationary lens 21 and a pair of cooperating movable scanning mirrors, half rate mirror 31 and full rate mirror 32 supported upon carriages not illustrated.

A document handler is also provided including a registration assist roll 35 activated when a document is inserted. Pinch rolls 38 are activated to feed the document about 180 degree through curved guides 42. The document is driven onto the platen 30 by a platen belt transport 39. After copying, the platen transport 41 is activated and the document is driven off the platen by the output pinch roll 48 into the document catch tray 49.

Figure 2:
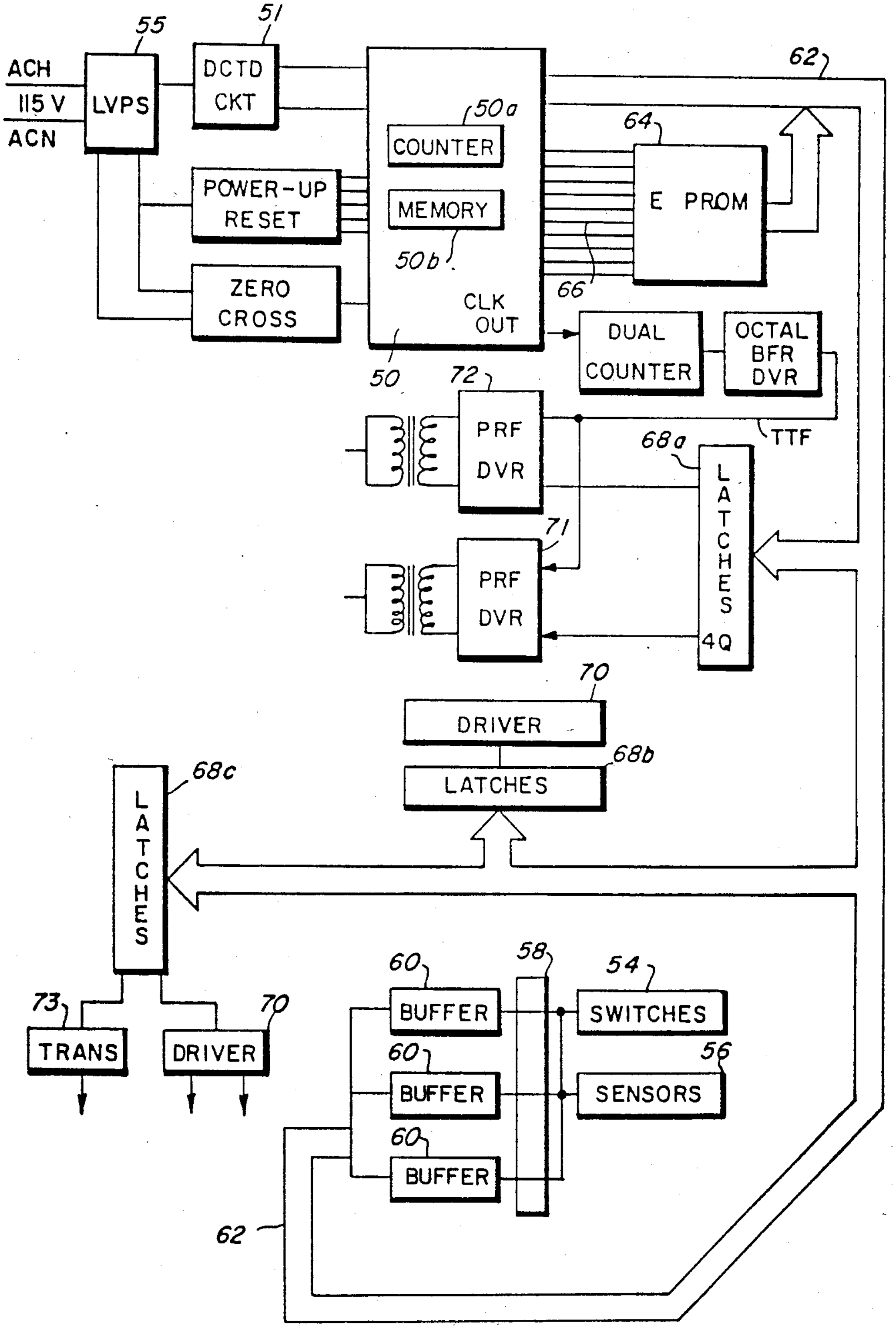
FIG. 2 is a block diagram illustrating the controller of the reproducing apparatus shown in FIG. 1.

With reference to FIG. 2, there is shown a controller including microprocessor 50 with counter 50*a* and memory 50*b*, and dedicated circuitry 51 connected to the reproduction machine. The reproduction machine has a low voltage source 55 connected to the dedicated circuitry 51 and an input line voltage source, preferably 115 volts alternating current. The reproduction machine also includes other, not shown, power supplies and distribution circuitry. A bidirectional bus 62 interconnects the microprocessor 50 and the reproduction machine and generally conveys signals from sensors 56 and switches 54 of the reproduction machine to microprocessor 50 and conveys control signals from microprocessor 50 to the reproduction machine.

The signals of various reproduction machine switches 54 and sensors 56 are conveyed through a resistance network 58 and suitable buffers 60 to the 8 bit external data bus 62 connected to microprocessor 50. The 8 bit data bus 62 is also connected to a suitable memory device such as EPROM 64 interconnected to microprocessor 50 through suitable address lines 66. It should be noted that the EPROM device 64 can be replaced by a suitable read only memory ROM internal to the microprocessor 50.

Outputs to the reproduction machine controlled elements are conveyed from the microprocessor 50 along the external data bus 62 to various latches 68*a*, 68*b* and 68*c*. The latches are interconnected to various drivers 70, 71 and 72, or transistors 73 to activate various clutches, solenoids, motor drives, triacs and power supplies in the reproduction machine.

Figure 3:
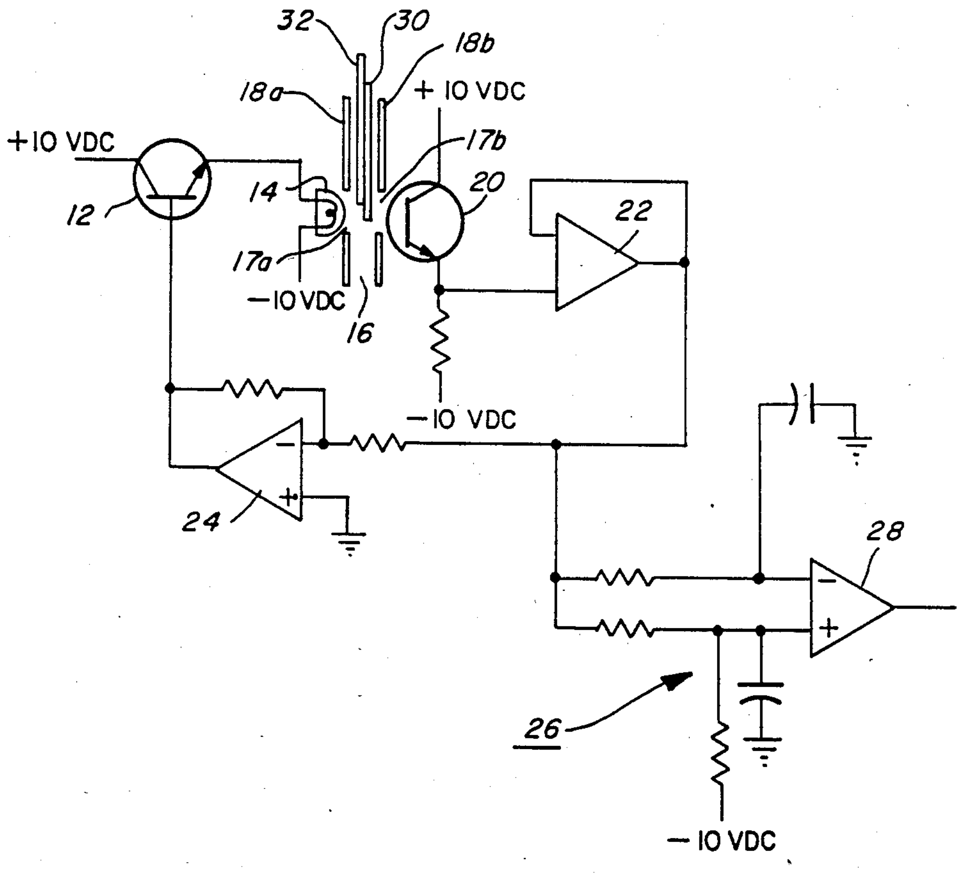
FIG. 3 is a circuit diagram of the detector in accordance with the present invention.

In accordance with the present invention, there is shown in FIG. 3 a double sheet or transparency detector. The detector has the capability of sensing a transparency or that two or more unregistered sheets are being transported. This is accomplished without contacting or disturbing the sheets being sensed in any manner. Multiple sheets passing the detector with lead edge difference of less than 0.1 were detected. The electronic sheet detector depends on the stepped change in the transmissibility of sheets or transparencies and one clear advantage of this feature to provide a signal that indicates a second or multiple document is present.

In general, a drive transistor 12 drives a lamp 14 suitably disposed near a paper path illustrated at 16. The light rays emitted from the lamp 14 are projected through the apertures 17*a*, 17*b* of the baffles 18*a*, 18*b* to the phototransistor 20. The current out of the phototransistor 20 to the operational amplifier 22 is dependent upon the amount of light received by the phototransistor 20.

The output of amplifier 22 is fed back to drive transistor 12 via amplifier 24 and also conveyed to an RC circuit generally illustrated at 26. The output of the RC circuit 26 is provided to amplifier 28, in turn delivering a control signal indicating a detected transparency or double feed.

The transistor 12 drives the phototransistor 20 into the linear region and holds it there via the feedback loop, basically holding the emitter of the phototransistor 20 to some predetermined level, preferably 0 volts. However, drift does occur and the reference can be above or below ground. This is not important as long as the phototransistor 20 is in the linear region. If contamination is deposited on the detector, the feedback loop through amplifier 24 will provide more drive to the lamp 14 thus providing sufficient drive to hold the emitter of the phototransistor 20 at its desired voltage.

In operation, for detection of a double feed or superposed sheets, as a first copy sheet 30 is passed between the lamp 14 and (phototransistor 20), two situations simultaneously occur. The RC network 26 of the common mode operational amplifier 28 detects a change and generates an output. Simultaneously, as the emitter of the phototransistor 20 shifts, the feedback loop drives the lamp 14 harder to readjust the emitter of the phototransistor to its nominal point. Thus, within the capabilities of the lamp/phototransistor pair, the phototransistor 20 stays in a linear region. As a subsequent sheet 32 enters the system, the transmissibility abruptly changes again thus causing the common mode operational amplifier 28 to provide a subsequent pulse.

Knowing the transport speed of the sheets 30, 32, the time between pulses can be used to determine the distance between the lead edge of the two sheets. It can be demonstrated that as a sheet enters the sensor area, the phototransistor 20 goes negative and the lamp 14 immediately is driven harder to drive the phototransistor to its nominal point. Small perturbations caused by the varying transmissibility of the media in the sensor can also be observed. However, the circuit ignores these small perturbations. When a second sheet enters the sensor, the circuit responds with a pulse out of the amplifier 28. In a similar manner, the edge of a transparency will cause an abrupt change in transmissibility. This abrupt change in transmissibility can, therefore, indicate the presence of a transparency.

It should be noted that since the device is capable of detecting edges, it can be used as a velocity detector. That is, since the edges of a sheet can be detected, given the sheet size, it is possible to calculate sheet velocity by adjusting the circuit gain.

Another feature of this device is the capability, in conjunction with additional operational amplifier or analog switches, to detect when a sensor pair needs cleaning. This is easily accomplished by setting an operational amplifier to provide a signal when an excessive amount of power is being consumed in the standby condition, i.e. no paper in paper path. This then can signal the operator to clean the sensor pair. In this mode, the operator would clean the sensor pair. Then with the contamination gone, the power to the emitter would be reduced.

While there has been illustrated and described what is at present considered to be a preferred embodiment of the present invention, it will be appreciated that numerous changes and modifications are likely to occur to those skilled in the art, and it is intended in the appended claims to cover all those changes and modifications which fall within the true spirit and scope of the present invention.

What is claimed is:

1. In a printing machine having sheets advanced through copy processing stations along a predetermined sheet path, a device for detecting superposed sheets at a sheet detection station comprising means for feeding sheet material along the sheet path past the copying processing stations, illumination means positioned along the sheet path at the sheet detection station, a photosensitive means for receiving illumination from said illumination means, the amount of illumination received by the photosensitive means being dependent upon whether a sheet is present or not present at the sheet detection station, and circuitry for detecting sheets in said sheet path, said circuitry comprising feedback means electrically connected to the photosensitive means for maintaining a constant illumination from the illumination means, and signal producing means connected to the feedback means to provide a signal in response to the stepped change in the amount of illumination received by the photosensitive means due to the presence of a copy sheet in the sheet path.

2. The device of claim 1 wherein said device is an edge detector.

3. The device of claim 1 including the means to detect superposed sheets with a lead edge difference of less than 0.1 inch.

4. The device of claim 1 wherein the photosensitive means is a phototransistor, the emitter of the phototransistor being maintained at a relatively constant voltage.

5. The device of claim 1 wherein the signal producing means includes an RC network and an operational amplifier connected to the RC network for generating an output signal.

6. The device of claim 4 wherein as the emitter of the phototransistor shifts, the feedback loop increases the illumination from the illumination means to readjust the emitter of the phototransistor to a nominal reference.

7. In a printing machine having a photosensitive element and a plurality of operating components cooperating with one another and the photosensitive element to produce images on copy sheets, a supply of copy sheets providing sheets along a copy sheet path for receiving images, and a detector along the copy sheet path for detecting superposed copy sheets within the path, the detector comprising an illumination means and a phototransistor for detecting light rays from the illumination means, the illumination means and phototransistor disposed along the copy sheet path, a driving circuit including a driver transistor to power the illumination means, a first operational amplifier connected to the phototransistor for providing an output signal from the phototransistor, a feedback loop connected between the first operational amplifier and the driver transistor to regulate the detector, and an output circuit connected to the feedback loop, the output circuit including a second operational amplifier and an RC circuit, the output circuit providing a first pulse for the detection of a copy sheet along the copy path and a second immediate pulse for the detection of a second copy sheet along the paper path indicating multiple or superposed copy sheets.

8. In a printing machine having transparencies advanced through copy processing stations along a predetermined transparency path, a device for detecting transparencies at a transparency detection station comprising means for feeding transparency material along the transparency path past the copying processing stations, illumination means positioned along the transparency path at the transparency detection station, a photosensitive means for receiving illumination from said illumination means, the amount of illumination received by the photosensitive means being dependent upon whether a transparency is present or not present at the transparency detection station, and circuitry for detecting transparencies in said transparency path, said circuit comprising feedback means electrically connected to the photosensitive means for maintaining a constant illumination from the illumination means, and signal producing means connected to the feedback means to provide a signal in response to the stepped change in the amount of illumination received by the photosensitive means due to the presence of a copy transparency in the transparency path.

* * * * *